Patented Jan. 9, 1951

2,537,493

UNITED STATES PATENT OFFICE 2,537,493

ALKYLOL AMIDES OF DIMERIZED FATTY ACIDS

Jack T. Thurston, Riverside, and Ruth B. Warner, Stamford, Conn., assignors to American Cyanamid Company, New York, N. Y., a corporation of Maine No Drawing. Application June 18, 1946, Serial No. 677,525

5 Claims. (Cl. 260—404.5)

This invention relates to bis-alkylol amides of heat polymerized or dimerized polyunsaturated fatty acids of approximately 18 carbon atoms. The invention includes the amides themselves, which are new compounds, and their methods of preparation. These new compounds are particularly valuable as intermediates for the production of non-ionic surface-active agents, which are obtained by condensing the compounds of the present invention with lower alkylene oxides of 2–4 carbon atoms as described in our copending application Serial No. 677,524 filed concurrently herewith. This application is now Patent No. 2,470,081 issued May 10, 1949. The non-ionic surface-active agents so obtained are particularly valuable as assistants in dyeing processes employing preformed metallized dyes in an acid dye bath.

It is well known that the polyunsaturated fatty acids of 18–20 carbon atoms, and particularly the dienic and trienic fatty acid mixtures obtained by the saponification of semi-drying and drying oils such as cottonseed oil, soya bean oil, dehydrated castor oil, linseed oil, tung oil, fish oils and the like, are converted by heating to dimers which are essentially organic dicarboxylic acids of the cycloaliphatic series. The most probable structural formulas for these dimerized fatty acids are given in volume 32 of Industrial and Engineering Chemistry, page 808, as follows:

Dimerization of octadecadienic acids and their esters by 1,4-diene addition leads to compounds of the following structure, or isomers thereof:

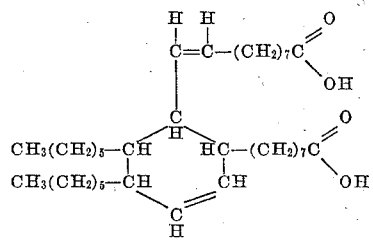

Conjugated and unconjugated octadecatrienic acids and their esters polymerize by a bimolecular addition involving an additional intramolecular ring closure, forming a compound of the following structure, or isomers thereof:

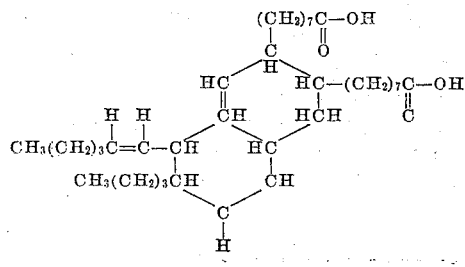

We have found that bis-alkylol amides of dimerized polyunsaturated fatty acids of the above types can be prepared by heating the dimer acids or their lower alkyl esters such as the methyl, ethyl or propyl esters with mono- or dialkylolamines containing alkylene radicals of 2-4 carbon atoms. This condensation yields diamides of the formula

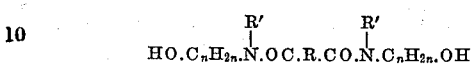

in which R is the residue of the dimerized polyunsaturated fatty acid, $n$ is 2, 3, or 4, and R' is either hydrogen or the radical —$C_nH_{2n}$.OH depending on whether the mono- or dialkyloamine was used. The diamides, which vary in appearance from dark, viscous liquids to non-crystalline solids, are soluble in alcohols and in aromatic hydrocarbon solvents but are insoluble in water.

Any polyunsaturated fatty acid of approximately 18 carbon atoms may be used as a starting material in preparing the compositions of the present invention. Fatty acid mixtures containing polyunsaturated fatty acids of approximately 18 carbon atoms, such as those listed above, are preferably employed in preparing the dimerized fatty acids because they are readily obtainable by the hydrolysis of natural oils of vegetable and animal origin, and it will be understood that the expression "dimerized polyunsaturated fatty acids of approximately 18 carbon atoms" refers to the monomeric fatty acids from which the dimerized acids are prepared by heat treatment rather than to the resulting dimers, which contain approximately 36 carbon atoms. The dimer acids may be used either in the form of the free acids or as the lower alkyl esters thereof, such as the methyl, ethyl or propyl esters, in preparing the alkylol amides of our invention.

Any mono- or dialkylolamine in which the alkylene radical or radicals contain 2-4 carbon atoms may be condensed with the dimerized higher fatty acids described above, or with their methyl, ethyl or propyl esters, to form dialkylol amides. Typical mono- or dialkylolamines which may be used are monoethanolamine, diethanolamine, monopropanolamine, dipropanolamine, monobutanolamine, dibutanolamine or mixed dialkylolamines containing one ethanol and one propanol substituent, or one ethanol and one butanol substituent, etc.

The above and other similar amines may be condensed with the dimerized higher fatty acids, or with their lower alkyl esters, simply by heating the two reagents together until the desired bis-alkylolamide is formed. Reaction temperatures of about 130°–200° C. are preferably employed. In some cases, as when starting with the free dimerized acids, it is convenient to carry out the condensation in the presence of organic solvents such as toluene, xylene and the like while distilling off the water produced by the amide formation. At least 2 mols of the amine are used for each mol of the dimerized acid or ester thereof, a small excess of amine over the dimolecular quantity being sometimes employed with the more volatile amines such as monoethanolamine.

As has been stated, the new compounds of the present invention are particularly useful as reagents for condensation with lower alkylene oxides such as ethylene oxide, propylene oxide or butylene oxide or similar compounds such as epichlorhydrin and glycidol for the production of water-soluble non-ionic surface-active agents. For this purpose at least 8 mols of ethylene oxide or at least 10–15 mols of propylene oxide or 15–25 mols of butylene oxide is preferably used for each mol of the dimer acid diamide, in order to obtain adequate water-solubility. The alkylene oxide condensation may be carried out in the absence of solvents by heating the dimer acid diamides with the alkylene oxide in an autoclave under pressures up to 4–5 atmospheres, preferably in the presence of a small quantity of a catalyst such as sodium alcoholate at temperatures of 100°–160° C. A more convenient method, however, is to carry out the condensation by dissolving the dimer acid diamide in a polar solvent such as isopropyl alcohol, tertiary butyl alcohol and the like, preferably with the addition of a lower alkyl amine such as triethylamine as catalyst, and to pass the alkylene oxide into the solution under a reflux condenser at atmospheric pressure, and at approximately the boiling point of the solvent used.

The invention will be further illustrated by the following specific examples. It should be understood, however, that although these examples may describe in detail certain preferred embodiments of the invention, they are given primarily for purposes of illustration and the invention in its broader aspects is not limited thereto.

EXAMPLE 1

The diamides of dimerized polyunsaturated fatty acids with mono- or dialkylolamines are prepared by refluxing a xylene solution containing one mol of the acid and two mols of the amine while distilling off the water produced by the amide formation. Sometimes an additional 10% molecular excess of the amine is added near the end of the reaction, since some of the amines may tend to distill off with the water.

For example, 56 parts by weight of dimerized cottonseed fatty acid were dissolved in 31 parts of xylene and 125 parts of monoethanolamine were added. The mixture was heated under a reflux condenser with a water trap until the distillation of water was almost complete, after which an additional 12 parts of monoethanolamine were added. Reflux was continued until no more water was evolved, after which the xylene was distilled at 140°–150° C. under a pressure of 20–30 mm. of mercury. The bis-ethanolamide of the dimerized acid was obtained as a dark, viscous liquid.

EXAMPLE 2

A solution of 840 grams (1.5 mols) of dimerized cottonseed fatty acids and 321 grams of diethanolamine in 550 cc. of xylene was heated under reflux at 135°–145° C. for about 12 hours while stripping out water from the distillate. After 66 cc. of water were collected the xylene was stripped under reduced pressure at temperatures up to 160° C. 1107 grams of bis-diethanolamide of dimerized cotton seed fatty acids were obtained as a dark brown, very viscous oil.

EXAMPLE 3

*Preparation of the bis-monoethanolamide of dimerized linseed acid*

A mixture of 200 grams (.342 mol) of the dimethyl ester of dimerized linseed acid (prepared according to Bradley, Industrial and Engineering Chemistry 32, 802 (1940)), and 57 grams (.684 mol plus 20% excess of 95% ethanolamine) was heated with stirring at 170°–180° C. for 2 hours in a nitrogen atmosphere. At the end of this time the excess ethanolamine and the methyl alcohol were distilled under water-pump pressure up to a temperature of 160° C. The product was a dark red oil. Yield 220 grams, 100% of theory.

EXAMPLE 4

*Preparation of the bis-monopropanolamide of dimerized soya bean fatty acid*

A mixture of 200 grams (0.36 mol) of dimerized soya bean fatty acid and 60 grams (0.72 mol plus 10% excess) of normal propanolamine and 130 ml. of xylene was refluxed with stirring, while continuously removing by means of a trap the water produced from the condensation. The reaction required 12½ hours at 135°–148° C. When the reaction was complete, as shown by the fact that no more water formed, the xylene and excess normal propanolamine were removed by distillation under water-pump pressure, while allowing the temperature to reach 150° C. The product was a viscous greenish-black oil. Yield 243 grams, 100% of theory.

EXAMPLE 5

*Preparation of the bis-butanolamide of dimerized soya bean fatty acid*

A mixture of 200 grams (0.36 mol) of dimerized soya bean fatty acid, 80 grams (0.72 mol plus 10% excess) of 2-amino-1-butanol and 150 ml. of xylene was refluxed at a temperature of 145°–155° C. for 20 hours. The water as it formed was removed by means of a trap. When the reaction was complete the xylene and excess butanolamine were stripped while slowly decreasing the pressure and increasing the temperature until a pressure of about 20 mm. and a temperature of about 160° C. was attained. The product was a dark green viscous oil. Yield 250 grams, 99% of theory.

EXAMPLE 6

*Preparation of the bis-monoethanolamide of dimerized tung oil fatty acid*

A mixture of 228 grams (0.39 mol) of the dimethyl ester of dimerized tung oil fatty acid (prepared according to Industrial and Engineering Chemistry 32, 802 (1940)) and 60 grams (0.78 mol plus 20% excess) of 95% ethanolamine was heated for 2 hours at 170°–180° C. in a nitrogen atmosphere. The excess ethanolamine and the methanol were distilled, the last amounts of which were removed at a final pressure of about 20 mm. and a temperature of about 190° C. The product was an amber colored viscous oil. Yield 253 grams, 100% of theory.

What we claim is:

1. Bis-alkylolamides of dimerized fatty acids of the formula

wherein R is the residue of dimerized polyunsaturated fatty acids of approximately 18 carbon atoms, $n$ is a whole number from 2–4 inclusive, and R' is a member of the group consisting of hydrogen and —$C_nH_{2n}$.OH.

2. Bis-alkylolamides of dimerized polyunsaturated fatty acids of the formula

wherein R is the residue of dimerized polyunsaturated fatty acids of approximately 18 carbon atoms and $n$ is a whole number from 2–4 inclusive.

3. Bis-monoethanolamides of dimerized polyunsaturated fatty acids of approximately 18 carbon atoms.

4. Bis-diethanolamides of dimerized polyunsaturated fatty acids of approximately 18 carbon atoms.

5. The method of producing bis-alkylolamides of dimerized fatty acids of the formula

wherein R is the residue of dimerized polyunsaturated fatty acids of approximately 18 carbon atoms, $n$ is a whole number from 2–4 inclusive and R' is a member of the group consisting of hydrogen and —$C_nH_{2n}$.OH which comprises heating one mol of a member of the group consisting of dimerized polyunsaturated fatty acids of approximately 18 carbon atoms and lower alkyl esters thereof with at least two mols of an alkylolamine of the formula

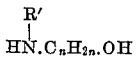

wherein $n$ and R' are as defined above and stopping the reaction when a bis-alkylolamide is formed as shown by the fact that no more water of condensation is formed.

JACK T. THURSTON.
RUTH B. WARNER.

REFERENCES CITED

The following references are of record in the file of this patent:

UNITED STATES PATENTS

| Number | Name | Date |
|---|---|---|
| 2,372,090 | Kirkpatrick | Mar. 20, 1945 |
| 2,372,797 | Segessemann et al. | Apr. 3, 1945 |
| 2,379,413 | Bradley | July 3, 1945 |
| 2,429,219 | Cowan et al. | Oct. 21, 1947 |
| 2,430,004 | DeGroote et al. | Nov. 4, 1947 |

OTHER REFERENCES

Ind. and Eng. Chem., 1940, pages 802–809 by Bradley et al.

Oil and Soap, vol. 21, page 101 (1944) by Cowan et al.

Oil and Soap, vol. 22, pages 143–148 (1945) by Fulkenburg et al.